United States Patent
Saita et al.

(10) Patent No.: US 9,617,690 B2
(45) Date of Patent: Apr. 11, 2017

(54) FLASH BUTT WELDING METHOD OF RAIL STEEL

(75) Inventors: Kenji Saita, Tokyo (JP); Hiroshi Fukuchi, Tokyo (JP); Yasunobu Tsutsumi, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 108 days.

(21) Appl. No.: 13/503,928

(22) PCT Filed: Oct. 26, 2010

(86) PCT No.: PCT/JP2010/068927
§ 371 (c)(1),
(2), (4) Date: Apr. 25, 2012

(87) PCT Pub. No.: WO2011/052562
PCT Pub. Date: May 5, 2011

(65) Prior Publication Data
US 2012/0234806 A1    Sep. 20, 2012

(30) Foreign Application Priority Data
Oct. 30, 2009   (JP) ................................. 2009-251071

(51) Int. Cl.
*B23K 26/20* (2014.01)
*E01B 29/42* (2006.01)
(Continued)

(52) U.S. Cl.
CPC .............. *E01B 29/42* (2013.01); *B23K 11/04* (2013.01); *B23K 2201/26* (2013.01)

(58) Field of Classification Search
CPC ..... B23K 11/04; B23K 11/046; B23K 11/043; B23K 11/246; B23K 11/0073;
(Continued)

(56) References Cited

U.S. PATENT DOCUMENTS 2,945,940 A     7/1960  Schlatter
3,748,430 A *   7/1973  Deffenbaugh ................. 219/97
(Continued)

FOREIGN PATENT DOCUMENTS

CA    1164057    3/1984
CA    1267697    4/1990
(Continued)

OTHER PUBLICATIONS

International Search Report dated Jan. 25, 2011, issued in corresponding PCT Application No. PCT/JP2010/068927.
(Continued)

*Primary Examiner* — Dana Ross
*Assistant Examiner* — Kuangyue Chen
(74) *Attorney, Agent, or Firm* — Birch, Stewart, Kolasch & Birch, LLP

(57) ABSTRACT

This welding method is a flash butt welding method of a pair of track rail steel pieces, having: a preheating process in which electric current is made to flow for a predetermined time in a state in which the welding surfaces of a pair of track rail steel pieces are forcibly brought into contact with each other, and vicinities of the welding surfaces are heated by resistance heating; a former flashing process in which flashing is partially caused in the welding surfaces, and the welding surfaces are heated by the resistance heating and arc heating of the flashing; and a latter flashing process in which the flashing is furthermore caused throughout the entire welding surfaces, and the entire welding surfaces are uniformly heated by the resistance heating and arc heating of the flashing, in which a latter flashing velocity is 2.1 mm/sec to 2.8 mm/sec in the latter flashing process.

13 Claims, 9 Drawing Sheets

(51) Int. Cl.
  *B23K 11/04* (2006.01)
  *B23K 101/26* (2006.01)

(58) Field of Classification Search
  CPC .. B23K 2201/26; B23K 9/0026; B23K 9/038;
    E01B 29/46; E01B 29/44; E01B 29/42;
    E01B 2/46; E01B 29/449
  USPC ...................................... 219/97, 100, 53–55
  See application file for complete search history.

(56) References Cited

U.S. PATENT DOCUMENTS

| | | | |
|---|---|---|---|
| 4,164,638 | A | 8/1979 | Ulmer |
| 5,270,514 | A | 12/1993 | Wechselberger et al. |
| 5,762,723 | A * | 6/1998 | Ueda et al. ................ 148/320 |
| 6,294,752 | B1 * | 9/2001 | Kuchuk-Yatsenko et al. .......................... 219/100 |
| 6,886,470 | B2 | 5/2005 | Norby et al. |
| 8,430,976 | B2 * | 4/2013 | Carroll et al. ............... 148/320 |
| 2007/0007251 | A1 * | 1/2007 | Kral et al. ..................... 219/54 |
| 2007/0034611 | A1 * | 2/2007 | Drius et al. .................. 219/110 |

FOREIGN PATENT DOCUMENTS

| | | |
|---|---|---|
| CN | 1257768 | 6/2000 |
| GB | 2299044 | 9/1996 |
| JP | 52-104439 | 9/1977 |
| JP | 53-007559 | 1/1978 |
| JP | 54-52645 | 4/1979 |
| JP | 63-215383 | 9/1988 |
| JP | 01-224169 | 9/1989 |
| JP | 02-307682 | 12/1990 |
| JP | 06-142939 | 5/1994 |
| JP | 06-145791 | 5/1994 |
| JP | 09-267183 | 10/1997 |
| JP | 10-225775 | 8/1998 |
| JP | 10-263835 | 10/1998 |
| JP | 2001-152291 | 6/2001 |
| JP | 2001-179461 | 7/2001 |
| JP | 2002-160063 | 6/2002 |
| JP | 2002-346611 | 12/2002 |
| JP | 2006-055863 | 3/2006 |
| JP | 2006055863 A * | 3/2006 |
| JP | 2006-104816 | 4/2006 |
| JP | 2007-289970 | 11/2007 |
| JP | 2007289970 A * | 11/2007 |
| RU | 2222415 | 1/2004 |
| SU | 313628 | 9/1971 |
| SU | 1500447 | 8/1989 |
| WO | WO 2005/001204 | 1/2005 |

OTHER PUBLICATIONS

Japanese Notice of allowance dated Dec. 6, 2011, issued in corresponding Japanese application No. 2011-509331, with an English translation thereof.
Welding metallurgy by the Nikkan Kogyo Shimbun, Ltd., Mar. 1972, with a partial English translation thereof.
Resistance Welding phenomena and its Applications (IV) by Society of Light-weighted Structure Joining Process, Japan Welding Society, Mar. 1993, with a partial English translation thereof.
Notice of Allowance dated Sep. 11, 2013 issued in corresponding Russian Application No. 2012117761 [With English Translation].
Office Action dated Mar. 4, 2014 issued in corresponding Chinese Application No. 201080048430.0 [with English Translation of Search Report].
Notice of Opposition dated Jan. 27, 2015 issued in corresponding AU Application No. 2010312602.
Office Action dated Apr. 7, 2015 issued in corresponding Canadian Application No. 2,778,891.
Statement of Grounds and Particulars Apr. 23, 2015 issued in corresponding Australian Application No. 2010312602.
R. Moor, Process monitoring during flash-butt welding, 163-172. At least the following Figures of D4 are relevant to the novelty of the claims. Figure 1 on p. 164, Figure 3 on p. 166. [Full Translation].
Deutsche Bahn AG, User Release Certificate No. 24 /2007 for Schlatter GA 100/580 Flash Butt Welder, Oct. 3, 2007. At least the following graphs from D5 are relevant to the novelty of the claims. Force (kN) vs Time, Current (A) vs time, and Travel (mm) vs Time. [Full Translation].
Nortrack, Work Order 201037779, Feb. 7, 2008.
"Flash-Butt Welding of Rails", Merkblatt Stahl, No. 258, 1981. At least the following passages and Figures from D13 are relevant to whether the claims involve an inventive step. Chapter 3, pp. 6-7 and Fig. 2. [Full Translation].

* cited by examiner

FLASH BUTT WELDING METHOD OF RAIL STEEL

TECHNICAL FIELD

The present invention relates to a flash butt welding method of rail steel. Particularly, the invention relates to a flash butt welding method of rail steel which can reduce heat-affected zones (HAZ) in welded portions of hypereutectoid rail steel with a high carbon content, and reduce uneven wear and surface damage of rails.

This application is a national stage application of International Application No. PCT/JP2010/068927, filed Oct. 26, 2010, which claims priority to Japanese Patent Application No. 2009-251071, filed Oct. 30, 2009, the content of which is incorporated herein by reference.

BACKGROUND ART

Flash butt welding is widely used as a welding method of steel. This method has beneficial features of automation feasibility, highly stable quality, short welding time, and the like.

The principles of the flash butt welding method will be described using FIGS. 1A to 1D.

Firstly, as shown in FIG. 1A, a voltage is applied to each of a pair of rail steels 1A and 1B, which are materials to be welded that are disposed opposite to each other, through electrodes 2 from a power supply 3. Simultaneously, the rail steel 1A is moved in the arrow 4 direction so that both end surfaces, which are surfaces to be welded of the rail steels 1A and 1B, are gradually brought close to each other. Then, a short-circuit current locally flows, and the end surfaces are abruptly heated and finally melted by resistance heating. As a result, the pair of rail steels 1A and 1B is bridged with molten metal. In the bridged portion, as show in FIG. 1B, an arc is generated, and a part of the molten metal is scattered (flashing). Furthermore, the end surfaces are heated by resistance heating and arc heating together with the occurrence of flashing, and the two are continuously repeated. This is termed a flashing process.

In addition, the process as shown in FIG. 1C is a process for carrying out heat input into the entire end surfaces of the rail steels 1A and 1B within a short time in the flashing process, and is termed a preheating process. In the preheating process, firstly, a large electric current is made to flow for a certain time in a state in which the pair of the rail steels 1A and 1B are forcibly brought into contact with each other, the vicinities of the end surfaces are heated by resistance heating, and then the pair of the rail steels 1A and 1B are pulled apart. These processes are repeated several times.

Since the preheating process effectively carries out heat input into the welding surface, and produces an effect of shortening the welding time, a welding method is employed in which the preheating process is combined with the flashing process. In addition, since flash butt welding is carried out in the atmosphere, a large amount of oxide is generated in the formed welded metal portion.

A velocity at which the pair of the rail steels are brought close to each other in the flashing process is termed a flashing velocity. In addition, the erosion amount of a molten, substance removed when the rail steels are brought close, and the molten metal is scattered in the flashing process is termed flash-off distance. If the flashing velocity becomes excessive while the heat input into the surfaces to be welded is not sufficient, a phenomenon termed freezing occurs. In freezing, the contact area is abruptly increased without occurrence of an arc or scattering of the molten metal, a large current flows, and flashing does not occur continuously. Since the freezing generates oxides, which deteriorates the bending performance, it is necessary to avoid the freezing as much as possible. In order to prevent the flashing from occurring, the balance between appropriate heat input into the surfaces to be welded, and the flashing velocity is important.

After the entire surfaces to be welded are eventually melted in the flashing process, as shown in FIG. 1D, the surfaces to be welded of the rail steels 1A and 1B are swiftly held together by a large welding pressure, the majority of the molten metal in the welded surfaces is removed outside, and portions behind the welded surfaces, which are heated to a high temperature, are pressed and deformed, thereby forming a joining portion. This is termed an upset process.

At this time, since the oxide generated during welding is miniaturized and dispersed while being exhausted, it is possible to decrease a possibility of the oxide remaining on the joined surfaces as a defect that inhibits the bending performance.

The oxide exhausted outside the joined surfaces in the upset process (bead portion) is removed by hot shearing or the like in the post processes.

In the above flash butt welding, since the respective welding processes are automated, the total welding time of the entire welding processes is short, 1.5 minutes to 4 minutes, resulting in a high welding efficiency. Therefore, in the field of rail production, flash welding is frequently employed as a factory welding method. In addition, the flash welding allows welding apparatuses to be compact, and is used for on-site welding on rail tracks.

As described above, flash butt welding is a technique that joins a pair of steel materials by heating and melting a pair of end surfaces of the steel materials, and then holding the end surfaces together with pressure. Here, the steel material welded in flash butt welding undergoes a temperature increase process, in which the steel material is heated from room temperature to a melting point, and a subsequent cooling process. As a result, the metallic structure thereof transforms. As such, an area in which the structure or mechanical properties, such as hardness, of the material to be welded are changed due to welding is termed a heat-affected zone (HAZ).

In determining the range of the HAZ, measurement of the area in which the mechanical properties are changed consumes time and efforts, such as hardness measurement. Therefore, it is common to employ relatively easy micro or macro observations, and the ranges which can be differentiated from the base material by such observations are designated as the HAZ (Non-patent document 1). In the present specification, an area which can be differentiated from the base material by the micro or macro-observation, as described later, will be termed a HAZ.

Rail steel made of hypereutectoid steel with a high carbon content contains 0.85% to 1.20% of C, and exhibits a pearlite structure. The pearlite structure exhibits a lamellar structure in which phases are alternately and densely overlapped: one of the phases being a pure iron phase which includes almost no carbon and is termed ferrite; and another being a layer of iron carbide ($Fe_3C$) termed cementite. In the process that generates pearlite, the transformation energy is converted to the interface energy of ferrite and cementite, and therefore the lamellar structure is formed.

Here, the structure transformation of rail steel exhibiting the pearlite structure during the temperature increase process is as follows.

(1) From room temperature to 500° C., the pearlite structure does not change.

(2) When the temperature exceeds 550° C., a change in the structure to reduce the interface energy of the lamellar structure, that is, decoupling and spheroidizing of the cementite begin. The spheroidizing of the cementite progresses as the temperature increases.

(3) The transformation of the pearlite structure to an austenite structure begins around the Ac1 transformation point of 720° C. As a result, a temperature region is present in which three phases of ferrite, spherodized cementite (spherical cementite), and austenite coexist in metal.

(4) When the temperature is further increased, either phase of ferrite or cementite is lost, and the three-phase structure turns into a two-phase structure of austenite and spherical cementite, or austenite and ferrite.

(5) When the temperature is further increased, a single-phase structure of austenite is formed.

(6) When the temperature is further increased and exceeds the melting point (solidus temperature), a molten phase is formed in the austenite structure.

(7) When the temperature is further increased, the pearlite structure is completely melted.

In flash butt welding, the peak temperature varies with the distance from the welded surface. That is, the peak temperature reaches higher than the melting point at the welded surface, but remains at room temperature in a sufficiently far portion from the welded surface. In summary, in the HAZ in rail steel exhibiting the pearlite structure, any of the structure transformations (1) to (7) occurs depending on the peak temperature. Specifically, the HAZ is divided into (1) a pearlite area (no change), (2) a spherical cementite area, (3) a three-phase area in which austenite, ferrite, and spherical cementite coexist, (4) a two-phase area of austenite and ferrite or austenite and spherical cementite, (5) an austenite single-phase area, (6) an area in which a mixture of an austenite phase and a molten phase is present, and (7) a completely molten area from the sufficiently far portion from the welded surface to the welded surface.

In the structures transformed in the temperature increase process, additional structure transformations occur respectively due to cooling, depending on decreases in the temperature, when the heating process of welding is finished, and a hardness distribution is formed in accordance with the structure transformations. The hardness distributions vary with the structures and the components, but the case of high-strength rail steel for a heavy load railway having a base material hardness Hv of 420 will be described below as an example.

(1) The pearlite area (the portion in which no structure transformation occurs in the temperature increase process) remains unchanged even after the cooling.

(2) In the spherical cementite area, the spherical cementite is cooled with no change, and exhibits a spherical structure even at room temperature. The hardness of the spherical cementite structure is low and approximately 300 Hv. That is, in the temperature increase process, spheroidizing of the cementite progresses as the peak temperature increases, and therefore the amount of the spherical cementite is increased toward the welded surface. Therefore, the spherical cementite area becomes more softened toward the welded surface in the cooling process.

(3) In the three-phase area in which austenite, ferrite, and spherical cementite coexist, as the temperature decreases, the austenite is transformed into pearlite, and the spherical cementite is cooled with no change to room temperature. Since the fraction of the austenite phase is increased as the peak temperature increases, and the fraction that turns into pearlite after the cooling is increased, the hardness is more restored toward the welded surface. The hardness of the spherical cementite structure is low and approximately 300 Hv.

(4) In the two-phase area of ferrite and austenite or austenite and cementite, the austenite is transformed into a pearlite structure during the cooling. Since the fraction of the austenite phase is increased as the peak temperature increases, and the fraction that turns into pearlite after the cooling is increased, the hardness is more restored toward the welded surface.

(5) In the austenite single-phase area, the austenite is transformed into a pearlite structure. The hardness of the area becomes almost constant.

(6) In the austenite area in which the molten phase is present, the liquid phase is firstly solidified into austenite, thus turns into an austenite single phase, and then is transformed into a pearlite structure. The hardness of the area becomes almost constant.

(7) The molten area is firstly solidified into an austenite single phase, and then transformed into a pearlite structure. The hardness of the area becomes almost constant.

As such, regardless of the temperature regions from which portions are cooled, every portion turns into a pearlite structure in which the ferrite and the cementite eventually form a lamellar structure. However, the areas (2) and (3) include the spherical cementite structure, thus are softened, and the hardness is changed depending on the fraction of the spherical cementite structure.

Therefore, a softened portion having a lowered hardness is generated in the welded portion of rail steel. When the softened portion is long in the longitudinal direction of a rail, and, furthermore, the hardness is significantly lowered, uneven wear progresses in the softened portion due to train wheels passing on the rail head portion, and a variety of problems occur.

Patent document 2 shows a hardness distribution in a welded portion in a joint of pearlite steel that is flash-butt-welded, and, in the document, the HAZ width is approximately 42 mm, and the softened width is approximately 25 mm to 30 mm.

Meanwhile, Patent Document 3 describes that, in railway rails, when the softened width is narrower than the contact area between train wheels and the rail, uneven wear does not easily occur, and, furthermore, since the contact area between train wheels and the rail is considered to be approximately 15 mm, the softened width having a hardness lower than that of the base material by 50 or more is desirably 15 mm or less.

FIG. 2A shows a macro cross-section in the longitudinal direction of a welded portion in a joint formed by welding hypereutectoid rail steel with a high carbon content by a flash butt welding method of the related art. FIG. 2B shows the hardness distribution from the rail surface layer to a depth of 5 mm in the vicinity of the welded portion in the joint as shown in FIG. 2A.

In addition, in the welding, a flash welder having an AC power supply, a transformer capacity of 240 kVA, and an upset load of 70 kN was used, preheating was carried out 7 times, the total time of an initial flashing process as shown in FIG. 3, which will be described below, and a former flashing process was set to 120 seconds, the latter flashing velocity in the latter flashing process was set to 0.5 mm/sec, and the latter flash-off distance was set to 3 mm.

As is clear from FIGS. 2A and 2B, the HAZ boundaries, which are determined on the macro cross-section, are located closer to the central side of the welded portion than ranges in which the hardness is changed, and are located slightly outside the location at which the hardness is most decreased. In FIG. 2B, the HAZ width is 35 mm, and the softened width is 19 mm, which shows that there is a concern regarding the above uneven wear.

Meanwhile, the softened width refers to a range in which the hardness falls below that of the base material. Since the hardness of the base material is also slightly inconsistent in actual cases, the softened width is set to a range in which the hardness falls below (the average value of the base material hardness−3×standard deviation).

However, since the equivalent hardness of the base material can be restored at the center of the welded portion when a thermal treatment is carried out as shown in Patent Document 1, basically, the center of the welded portion is not included in the softened portion. Meanwhile, in a case in which a thermal treatment is not carried out, or the effect of a thermal treatment is small, and the hardness at the center of the welded portion does not reach the base material hardness, an auxiliary line is drawn toward the central side of the welded portion in the hardness distribution, and a range determined by the intersection of the line with the (the average value of the base material hardness−3×standard deviation) forms the softened width. In FIG. 2B, the softened width was obtained by this method, and was 19 mm.

Regarding the above problem of softening in the flash-butt-welded portion, the following technique is proposed.

Patent Document 3 discloses a technique in which rails are flash-butt-welded with a dolly block mounted thereon, and thus the head portion of the rail is cooled by the dolly block during welding. The contact range between the dolly block and the rail includes at least the head top surface of the rail in the cross-section of the rail, and the length of the contact range in the rail axis direction on the head top surface is 15 mm or more. The thickness of a portion in which the dolly block and the head top surface come into contact with each other is 10 mm or more. The front end of the dolly block on the rail end surface side is located 20 mm to 50 mm away from the rail end surface which is yet to be welded. It is shown that use of this technique can set the longitudinal-direction width having a hardness that is lower than that of the base material by 50 Hv or more to 15 mm or less.

Patent Document 4 shows an example in which the range of the latter flash-off distance is 2 mm to 8 mm, and the range of the latter flashing velocity is 1 mm/s to 4 mm/s when a hot rolling billet is welded using a flash welder with an AC power supply. The welding was performed after the billet is extracted from a billet heating furnace, and before supplied to a first roller.

Here, the latter flashing velocity is (the entire flash-off distance−the former flash-off distance)/(the entire flashing time−the former flashing time).

Patent Document 5 shows a continuous rolling method of a metal material in which the rear end of a preceding material to be welded is joined to the front end of a following material to be welded by flash butt welding, and then the materials are continuously rolled using downstream rolling mills array, thereby producing a metal finishing material, in which the materials are joined with the flashing amount Y (flash-off distance) set to satisfy the following Formula (2).

$$0.1D \leq Y < 0.30D \quad \text{Formula (2)}$$

Herein, Y is the flashing amount (flash-off distance) (mm), D is the diameter of the material to be welded (mm), and the flashing amount (flash-off distance) is the total distance of the material that is melted and removed by an arc during the flash butt welding.

Non-patent document 2 shows a method in which the flashing (flash) velocity is abruptly increased immediately before upsetting, and the butt end surface is flattened and smoothened as a method for producing a high-quality flash butt welding joint by flash-butt-welding of a rail. Specifically, it is shown that a favorable final flashing (flash) velocity is 1.0 mm/sec to 1.25 mm/sec. The flash-off distance at this time is stated to be 3 mm.

CITATION LIST

Patent Literature

[Patent Document 1] Japanese unexamined patent application, first publication No. H06-145791
[Patent Document 2] Japanese unexamined patent application, first publication No. 2001-152291
[Patent Document 3] Japanese unexamined patent application, first publication No. 2007-289970
[Patent Document 4] Japanese unexamined patent application, first publication No. S53-007559
[Patent Document 5] Japanese unexamined patent application, first publication No. 2002-346611

Non-Patent Literature

[Non-patent document 1] Welding metallurgy by the Nikkan Kogyo Shimbun, Ltd.
[Non-patent document 2] Resistance Welding phenomena and its Applications (IV) by Society of Light-weighted Structure Joining Process, Japan Welding Society

SUMMARY OF INVENTION

Technical Problem

As described above, a softened portion having a lowered hardness is generated in a rail welded portion. When the softened portion is long in the longitudinal direction of a rail, and, furthermore, the hardness is significantly lowered, uneven wear progresses in the softened portion due to train wheels passing on the rail head portion, which sometimes causes noise and vibration. In addition, when uneven wear becomes large, there are cases in which an impact on the rail is increased when train wheels pass.

However, regarding the generation of the softened portion, the following problem occurs in the related art.

Since the contact area between train wheels and the rail is considered to be approximately 15 mm as shown in Patent Document 3, in a case in which the HAZ width is approximately 42 mm, and the softened width is approximately 25 mm to 30 mm as shown in Patent document 2, uneven wear progresses in the softened portion, and an impact on the rail is liable to be increased when train wheels pass.

In addition, in the method in which a dolly block is mounted, such as in Patent document 3, since it is necessary to mount a separately prepared dolly block in a specified range, a dolly block-mounting process must be newly provided before welding. In addition, since molten metal that is scattered extremely close to a butt end surface is fixed to the dolly block, time and effort are required to remove the fixed flash. Furthermore, since it is not easy to remove the dolly block, there is a problem in that the advantages of flash butt welding having a high automated welding efficiency are impaired.

In addition, Patent document 4 shows the setting of the latter flashing velocity in a range of 1 mm/sec to 4 mm/sec, but the material to be welded is a high-temperature heated billet extracted from a heating furnace, and the technique of Patent document 4 is only applicable under a condition in which the butt end surface and the other portions are at a sufficiently high temperature. Under this condition, flashing easily occurs, and freezing does not easily occur. In addition, since the flashing velocity can be easily increased under this condition, the technique of Patent document 4 cannot be applied to solve the above problem in which rails are heated from a room temperature state.

In addition, in the case of heavy load rail, the area of the cross-section perpendicular to the rail longitudinal direction becomes 8500 mm$^2$ or more. In this case, the flash-off distance becomes in a range of 5 mm to 16 mm in Patent document 5. However, in Patent document 5, the material to be welded is a processed metallic material, such as a billet extracted from a heating furnace, or a rolled material obtained by rolling the processed metal material into a metallic coarse material with a predetermined dimension. This technique relates to a continuous rolling method of a metallic material in which a preceding material to be rolled and a following material to be rolled are joined in a rolling line by flash butt welding, and then the materials are continuously rolled using downstream rolling mills array. That is, similarly to Patent document 4, the technique is only applicable under a condition in which the butt end surface and the other portions are at a sufficiently high temperature, and cannot be applied to solve the above problem in which rails are heated from a room temperature state.

Non-patent document 2 relates to a flash butt welding method of rails, but focuses on the bending performance, and, furthermore, the final flashing velocity is slow and the flash-off distance is not sufficient, resulting in an inability to obtain a narrow softened width.

An object of the invention is to provide a flash butt welding method of rail steel in which softening of rail welded portions is suppressed without causing the above problems, so that uneven wear of rails can be reduced.

Means for Solving the Problem

As a countermeasure to the above problems, the invention relates to a method in which, in flash butt welding of hypereutectoid rail steel with a high carbon content and the like, the HAZ width is reduced in the rail top portion, the softened width is reduced, and uneven wear of the rail is suppressed. The specific method is as follows.

(1) A method according to an aspect of the invention is a flash butt welding method of a pair of track rail steel pieces, having an initial flashing process in which a voltage is applied to the pair of track rail steel pieces, and welding surfaces, which are the end surfaces of the pair of track rail steel pieces, are slowly brought close to each other so that short-circuit currents are made to flow locally, the welding surfaces are heated and welded through resistance heating, furthermore, flashing is caused in the welding surfaces, and the welding surfaces are heated by the resistance heating and arc heating of the flashing; a preheating process in which an electric current is made to flow for a predetermined time in a state in which the welding surfaces are forcibly brought into contact with each other, and vicinities of the welding surfaces are heated by the resistance heating; a former flashing process in which the flashing is partially caused in the welding surfaces, and the welding surfaces are heated by the resistance heating and the arc heating of the flashing; and a latter flashing process in which the flashing is furthermore caused throughout the entire welding surfaces, and the entire welding surfaces are uniformly heated by the resistance heating and arc heating of the flashing, wherein a latter flashing velocity in the latter flashing process is 2.1 mm/sec to 2.8 mm/sec.

(2) In the flash butt welding method according to the above (1), a latter flash-off distance in the latter flashing process may be 10 mm to 60 mm in the latter flashing process.

(3) In the flash butt welding method according to the above (1), a latter flash-off distance in the latter flashing process may be in the range: 60 mm≥[latter flash-off distance]≥22.6−6×[erosion amount per second in the latter flashing process].

(4) In the flash butt welding method according to the above (1) or (2), each of the pair of track rail steel pieces may contain C: 0.85% to 1.20% by mass %.

(5) In the flash butt welding method according to the above (1) or (2), a HAZ width in a welding joint portion may be 27 mm or less, and a softened width may be 10 mm or less.

(6) A method according to another aspect of the invention is a flash butt welding method of a pair of track rail steel pieces, having a preheating process in which an electric current is made to flow for a predetermined time in a state in which welding surfaces of the pair of track rail steel pieces are forcibly brought into contact with each other, and vicinities of the welding surfaces are heated by resistance heating; a former flashing process in which a flashing is partially caused in the welding surfaces, and the welding surfaces are heated by the resistance heating and arc heating of the flashing; and a latter flashing process in which the flashing is furthermore caused throughout the entire welding surfaces, and the entire welding surfaces are uniformly heated by the resistance heating and the arc heating of the flashing, wherein a latter flash-off distance in the latter flashing process is in the range 60 mm≥[latter flash-off distance]≥22.6−6×[erosion amount per second in the latter flashing process].

(7) In the flash butt welding method according to the above (6), a latter flashing velocity in the latter flashing process may be 0.5 mm/sec to 2.8 mm/sec.

(8) In the flash butt welding method according to the above (6) or (7), the track rail steel may contain C: 0.85% to 1.20% by mass %.

(9) In the flash butt welding method according to the above (6) or (7), the HAZ width in a welding joint portion may be 27 mm or less, and a softened width may be 10 mm or less.

Advantageous Effects of Invention

According to the respective aspects of the invention, in the flashing process of flash butt welding, the latter flashing velocity during the latter flashing process is increased, and, furthermore, the latter flash-off distance at this period is increased so that the heat distribution on the welding surface becomes precipitous, and therefore the HAZ width is decreased, and the softened width is also decreased. As a result, uneven wear due to the contact between the rail head portion and train wheels is reduced, and therefore damage occurring on the rail head portion surface can be reduced, and, furthermore, noise or vibration can be reduced. In addition, as a result of the reduction of uneven wear, damage on the surface, and the like, it can contribute to elongate intervals of grinding cutting on the rail surface layer and also the elongation of rail exchange cycle.

In addition, since uneven wear is reduced, an impact supplied to a rail when train wheels pass can be suppressed, and it is possible to prevent fatigue breakdown of the rail.

BRIEF DESCRIPTION OF DRAWINGS

FIG. 1A is a schematic cross-sectional view for explaining the principle of the flash butt welding method, showing the disposition of rail steel, electrodes, and the like.

DESCRIPTION OF EMBODIMENTS

Figure 1A:
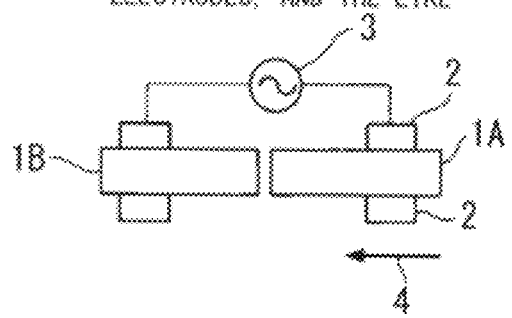
Figure 1B:
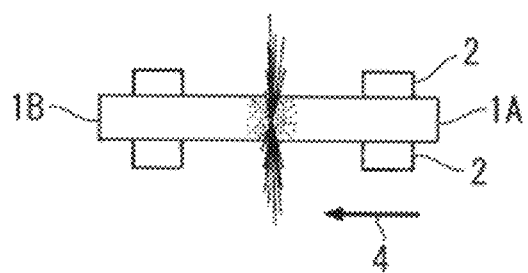
FIG. 1B shows the flashing process of the flash butt welding method.
Figure 1C:
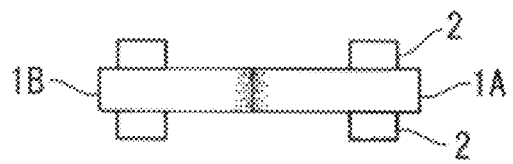
FIG. 1C shows the preheating process of the flash butt welding method.
Figure 1D:
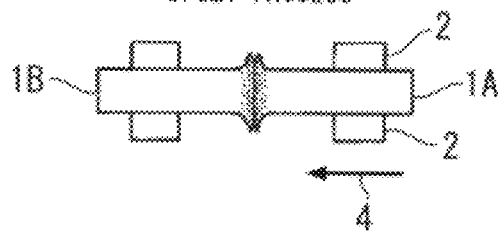
FIG. 1D shows the upset process of the flash butt welding method.

As rails that satisfy wear resistance necessary for heavy load railway rail, hypereutectoid rail steel with a high carbon content, which contains 0.85% to 1.20% of C and has a pearlite structure, is widely used.

The present inventors conceived that, in order to solve the above problems in welded portions in a case in which the rail steel is flash-butt-welded, it is effective to provide a precipitous heat distribution in the vicinity of a welded surface so as to reduce the softened width in a welding portion. In addition, the inventors conceived that, as a method for realizing the above, it is effective to decrease the heat input in the vicinity of the welded surface and increase the heat input rate immediately before the upset process.

Hereinafter, an embodiment of the flash butt welding method according to the present invention will be described.

The method described in the embodiment is a flash butt welding method of a pair of steel pieces for track rail, having an initial flashing process in which a voltage is applied to the pair of track rail steel pieces, and welding surfaces, which are the end surfaces of the pair, are slowly brought close to each other so that short-circuit currents are made to flow locally, the welding surfaces are heated and welded through resistance heating, furthermore, flashing is caused in the welding surfaces, and the welding surfaces are heated by the resistance heating and arc heating of the flashing; a preheating process in which an electric current is made to flow for a predetermined time in a state in which the welding surfaces are forcibly brought into contact with each other, and the vicinities of the welding surfaces are heated by resistance heating; the flashing process in which the flashing is partially caused in the welding surfaces, and the welding surfaces are heated by the resistance heating and arc heating of the flashing; and a latter flashing process in which the flashing is furthermore caused throughout the entire welding surfaces, and the entire welding surfaces are uniformly heated by the resistance heating and arc heating of the flashing, in which a latter flashing velocity is 2.1 mm/sec to 2.8 mm/sec in the latter flashing process.

The inventors carried out flash butt welding using the American Railway Engineering Association's 136 RE rails which have a weight per meter of 136 pounds (61.2 kg). The flash butt welding was carried out using a flash welder having an AC power supply, a transformation capacity of 320 kVA, and an upset load of 70 kN in a mode in which a flashing process and a preheating process were combined. Meanwhile, the same method can be used for AREA 141 AB having a weight of 141 pounds (63.45 kg), and the same effects can be obtained as in the case of AREA 136 RE rail of 136 pounds (61.2 kg).

Meanwhile, it is not necessary to limit the composition and components of the railway rail steel, but it is preferable to contain C: 0.85% to 1.20% by mass %.

Here, the respective processes of the flash butt welding method of the embodiment and an example of the flash butt welding method will be described using FIG. 3.

The flash butt welding method of the embodiment includes an initial flashing process, a preheating process, a former flashing process, a latter flashing process, and an upset process.

The initial flashing process is a flashing process begun by cold rolling (at room temperature) in which flashing is caused so that welding surfaces are adjusted to be perpendicular to the rail longitudinal direction and the welding surfaces are heated by the resistance heating and arc heating of the flashing in order to facilitate the contact between the welding surfaces in the preheating process that is subsequently carried out.

Figure 3:
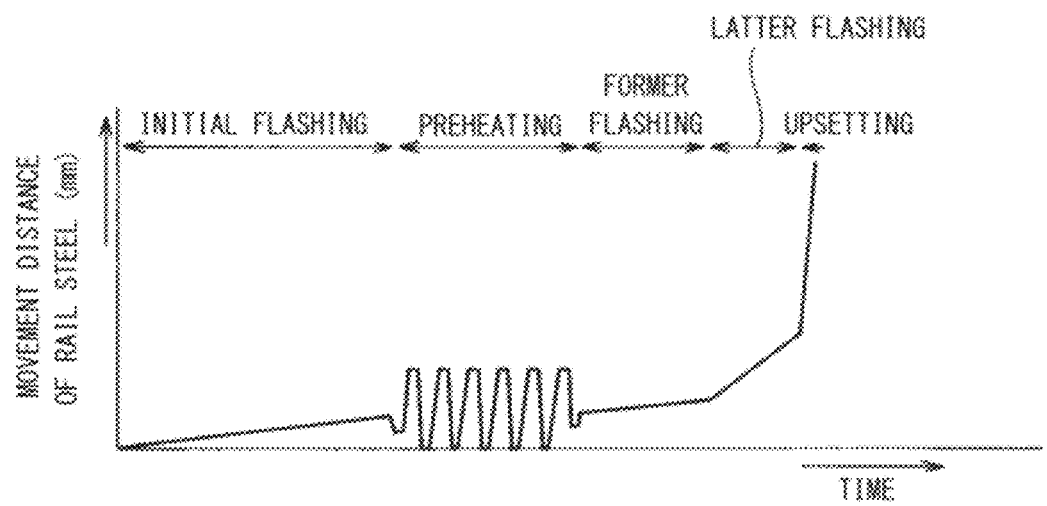
FIG. 3 is a view showing an example of the change in the movement distance of rail steel in the respective processes of flash butt welding of the embodiment.

In addition, since flashing is caused in the initial flashing process, the flash-off distance (erosion amount) is increased as shown in FIG. 3. The flash-off distance refers to the distance of rail lost by melting scattering or deformation in the respective processes.

Next, in the preheating process, a large electric current is made to flow between a pair of rail steels for a certain time in a state in which the facing welding surfaces are forcibly brought into contact with each other, and the vicinities of the welding surfaces are heated by resistance heating. After that, the pair of rail steels are pulled apart, which is repeated several times.

In addition, the number of preheating processes is preferably set to 4 or more, more preferably 7 or more, and further preferably 10 or more. In the preheating process, since the facing welding surfaces are forcibly brought into contact with each other, and a large electric current is made to flow as described above, the heat input efficiency is high compared with the flashing process. Therefore, a larger number of preheating processes is more preferable.

In addition, generally, the preheating process is carried out in the atmospheric environment, an oxide which acts as a welding defect, is generated in the welding surface.

Next, the flashing process after the preheating process will be described.

The flashing process after the preheating process in the embodiment is composed of the former flashing process and the latter flashing process, in which the flashing velocity differ respectively.

In the former flashing process, flashing is partially caused between the facing welding surfaces, and the welding surfaces are heated by the resistance heating and arc heating of the flashing. Here, the flashing caused in the former flashing process is termed the former flashing.

The total time of a time necessary for the initial flashing process (initial flashing time) and a time necessary for the former flashing process (former flashing time) is preferably 20 seconds to 180 seconds. In order to efficiently carry out the preheating process which is subsequently carried out, it is necessary to make the end surfaces perpendicular in the initial flashing process, and, when the time is too short, it is difficult to obtain the effects, and the total time needs to be 20 seconds or more. In addition, when the total time of the initial flashing time and the former flashing time is too long, the HAZ width becomes excessively wide, and therefore the total time of the initial flashing time and the former flashing time is preferably 180 seconds or less.

Similarly to the former flashing process, flashing is caused between the facing welding surfaces in the latter flashing process, but the latter flashing process is different from the former flashing process in that the flashing velocity in the latter flashing process (the latter flashing velocity) is increased to higher than the flashing velocity in the former flashing process (the former flashing velocity).

That is, in the latter flashing process, the flashing caused in the part of the welding surfaces in the former flashing process is caused in the entire welding surfaces by increasing the flashing velocity, and the entire welding surfaces are uniformly heated by the resistance heating and arc heating of the flashing.

In addition, in the latter flashing process, the oxide generated during the preheating process is decreased by scattering the oxide through flashing.

Meanwhile, the flashing caused in the latter flashing process is termed the latter flashing to differentiate from the former flashing.

Next, the upset process will be described.

After the entire welding surfaces are melted by the latter flashing process, the welding surfaces are abruptly brought close to each other by a large welding pressure, a majority of the molten metal on the welding surfaces is exhausted outside, and the rear portions of the welding surfaces, which are heated to a high temperature, are pressurized and deformed, thereby forming a welded portion. That is, the oxide generated during welding is exhausted, micronized, and dispersed, and therefore it is possible to decrease the possibility of the oxide remaining on the welding surfaces as a defect that impairs the bending performance. Meanwhile, the oxide exhausted outside the welding surfaces in the upset process (bead portion) is removed by hot shearing or the like in the post process.

FIG. 3 shows an example of the former flashing process having a constant flashing velocity, but the same effects can be obtained even in a case in which the velocity is increased as time elapses. In a case in which the former flashing velocity is accelerated, the average velocity is considered the former flashing velocity.

In addition, in a case in which the latter flashing velocity is accelerated, the average velocity is considered the latter flashing velocity.

Furthermore, in a case in which the flashing velocity is increased as time elapses from the end of the preheating process to the upset process, and it is difficult to differentiate the former flashing process and the latter flashing process, the first half of the elapsed time from the end of the preheating process to the upset process is considered the former flashing process, and the second half is considered the latter flashing process. In addition, the average velocity of the flashing velocity in the former flashing process is considered the former flashing velocity, and the average velocity of the flashing velocity in the latter flashing velocity is considered the latter flashing velocity. Meanwhile, in flash butt welding, since the flashing velocity and the flash-off distance are set by condition setting before welding, it is possible to know in advance the elapsed time from the end of the preheating process to the beginning of the upset process.

In addition, in the embodiment, the latter flashing velocity in the latter flashing process is set to 2.1 mm/sec to 2.8 mm/sec.

Since the effect of uniformly heating the entire welding surfaces becomes small when the flashing velocity is slow, a faster flashing velocity is preferable. Therefore, the lower limit value of the latter flashing velocity is set to 2.1 mm/sec. However, when the latter flashing velocity is excessively fast, there are cases in which freezing occurs, and therefore the upper limit of the flashing velocity is set to 2.8 mm/sec.

Hereinafter, the numerical limitation of the latter flashing velocity in the embodiment will be described in more detail.

The inventors considered that the heat distribution in the vicinities of the welding surfaces becomes precipitous by increasing the latter flashing velocity immediately before the upset process, and, consequently, the HAZ width and the softened width are reduced, and obtained the relationships between the latter flashing velocity and the HAZ width and the softened width.

Meanwhile, when the latter flashing velocity is simply increased, freezing, which acts as a cause of a welding defect, occurs as described above. Therefore, with regard to the heat input amount before the latter flashing velocity is increased, a flashing time and the number of preheating processes, which are preferable so that the latter flashing process can be begun at an increased latter flashing velocity, and, even in the subsequent processes, the latter flashing is stabilized and maintained, are set.

In the embodiment, the number of preheating processes is set to 7, and the total time of the initial flashing process and the former flashing process is set to 120 seconds. In addition, flash butt welding is carried out by changing the latter flashing velocity and the latter flash-off distance respectively in the latter flashing process.

Meanwhile, the latter flash-off distance indicates the erosion amount of a material to be welded removed by scattering of welding metal from rail steel in the latter flashing process (length of eroded rail).

Next, after the flash butt welding under the above conditions, the cross sections in the rail longitudinal direction from the welding surfaces are macro-observed, and the HAZ width 5 mm below the surface layer of the rail steel head portion is obtained. Furthermore, a Vickers hardness test is carried out, similarly to the HAZ width observation, at a location 5 mm below the surface layer of the rail head portion using a test force of 100 N, a range falling below the average value of the hardness of the base material −3σ is obtained, and the range is considered the softened width.

Figure 4:
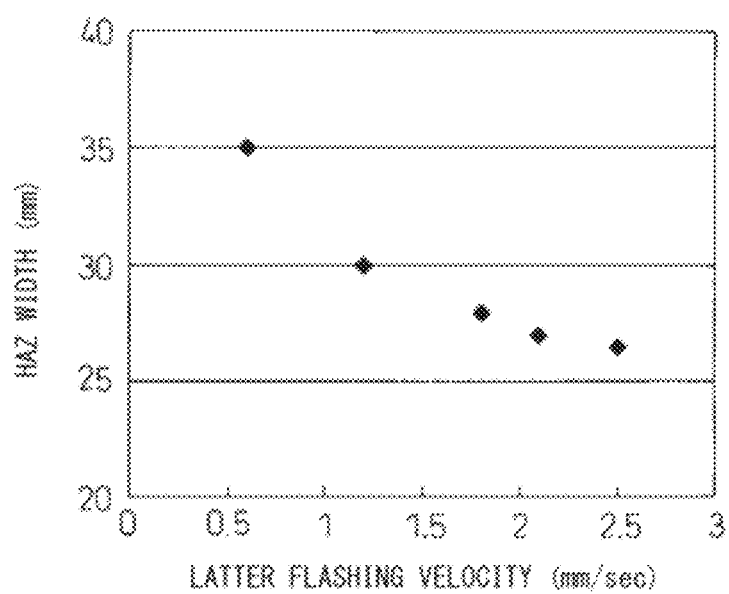
FIG. 4 is a view showing the relationship between the latter flashing velocity and the HAZ width in the embodiment.

Firstly, the relationship between the latter flashing velocity and the HAZ width in a case in which the latter flash-off distance is set to 3 mm, and the flash butt welding is carried out under the above welding conditions is shown in FIG. 4.

As shown in FIG. 4, as the latter flashing velocity is increased, the HAZ width is decreased. This is because, when the flashing velocity is increased, an electric current is increased, and therefore the heat input amount injected per unit time is increased, and, consequently, the temperature distribution in the perpendicular direction to the rail axis from the welding surfaces becomes precipitous.

Figure 5:
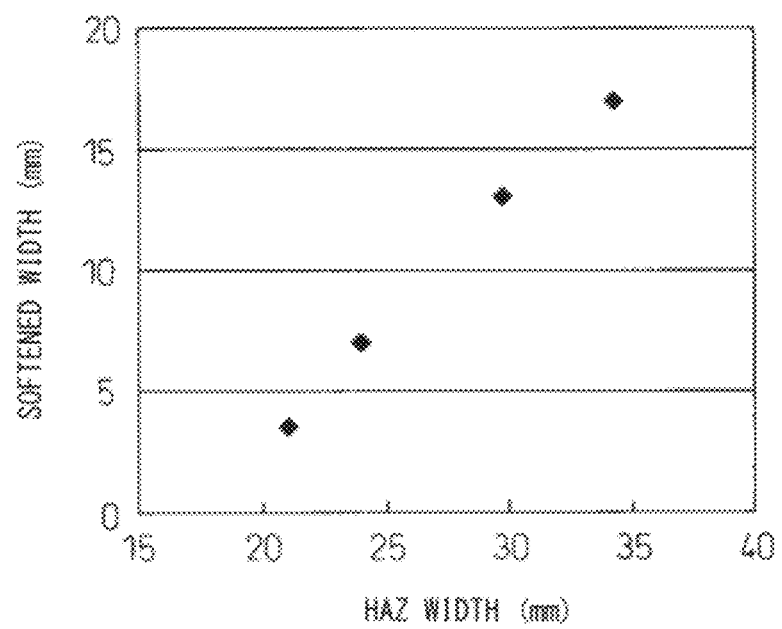
FIG. 5 is a view showing the relationship between the HAZ width and the softened width in the embodiment.

In addition, the relationship between the HAZ width and the softened width at this time is shown in FIG. 5. As shown in FIG. 5, a strong proportionate relationship exists between the HAZ width and the softened width.

Figure 6A:
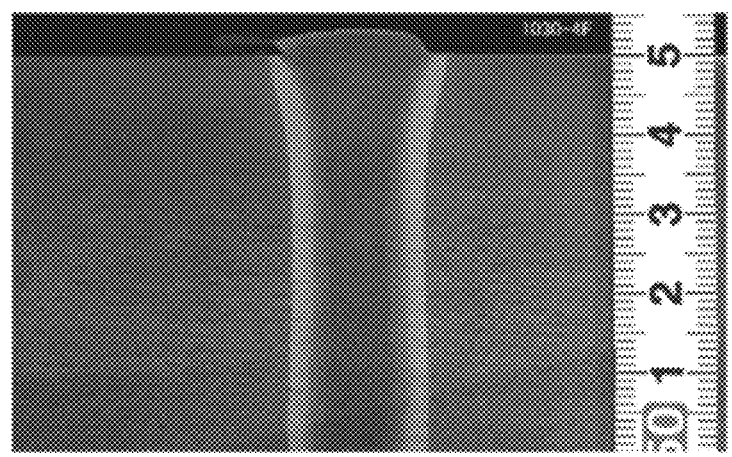
FIG. 6A is a view showing the macro cross-section of the flash butt welding joint of the embodiment.

Next, FIG. 6A shows a macro cross-section of the center of the welded portion in the rail longitudinal direction in a case in which the latter flashing velocity is 2.1 mm/sec as shown in FIG. 4. In addition, FIG. 6B shows the Vickers hardness distribution measured 5 mm below the surface layer of the rail steel head portion.

Figure 2A:
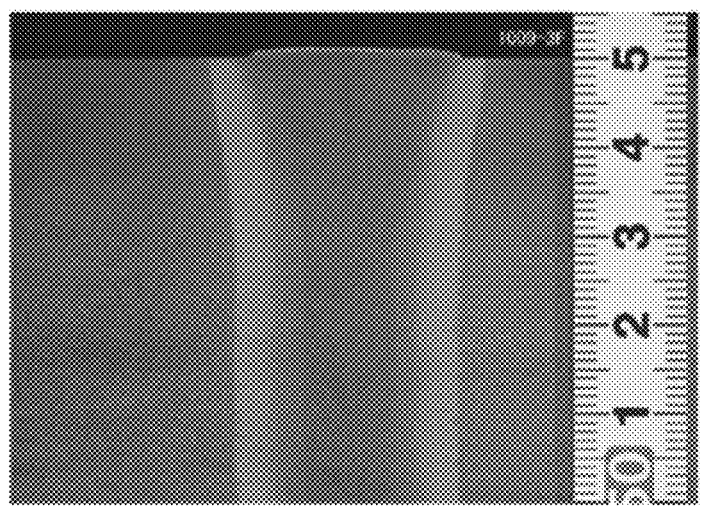
FIG. 2A is a view showing an example of the macro cross-section of a flash butt welding joint of the related art.
Figure 2B:
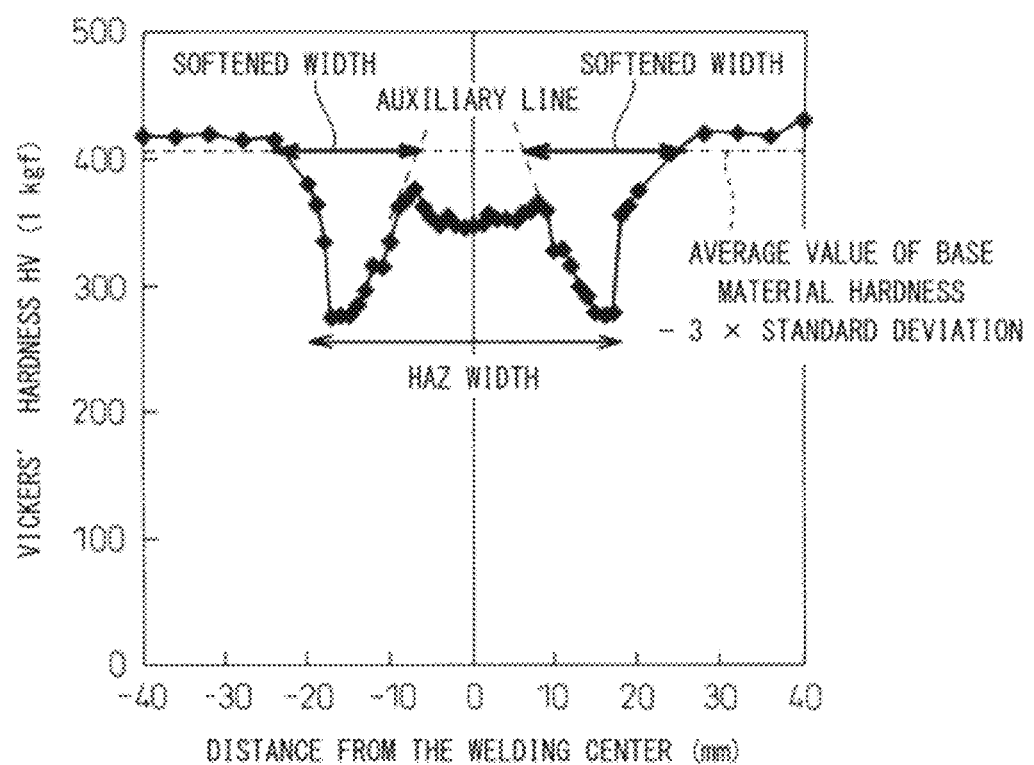
FIG. 2B is a view showing an example of the hardness distribution in a flash butt welding joint of the related art.
Figure 6B:
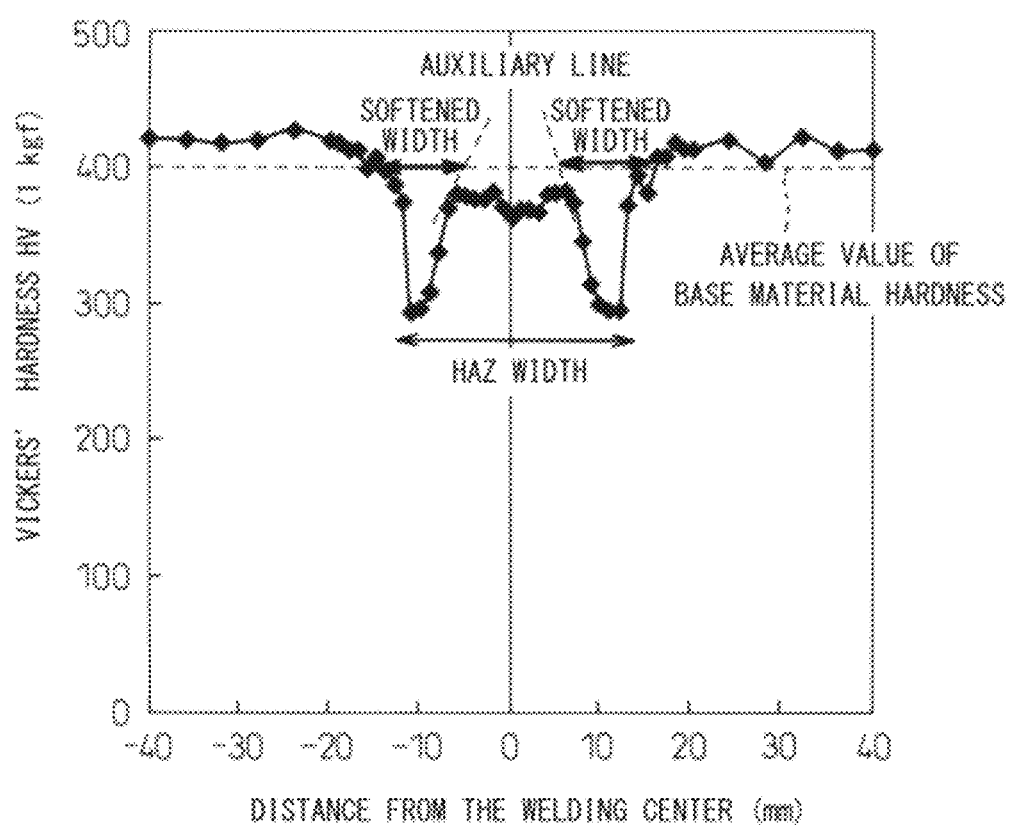
FIG. 6B is a view showing the hardness distribution of the flash butt welding joint of the embodiment.

FIG. 6B shows that, in a case in which the latter flashing velocity was 2.1 mm/sec, the HAZ width was 24 mm, and the softened width was 8 mm. In addition, in a case in which the latter flashing velocity as shown in FIG. 2B was 0.5 mm/sec, the HAZ width was 35 mm, and the softened width was 19 mm. That is, it is found from the above fact that the HAZ width and the softened width are narrowed as the latter flashing velocity is increased.

Figure 7:
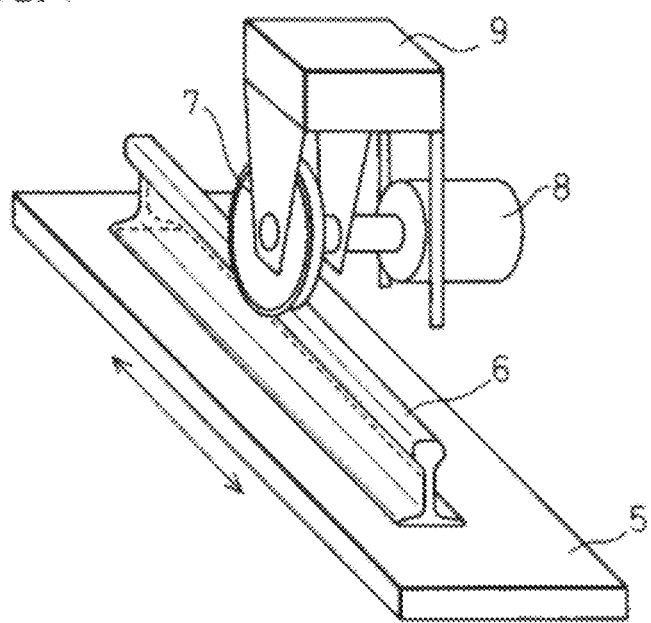
FIG. 7 is a view showing the outline of a rolling fatigue tester that is used in the embodiment.

Next, flash butt welding was carried out under the above conditions, welding joints having several kinds of HAZ widths and softened widths, which are obtained by the flash butt welding, were used as test specimen materials, and the relationship between the uneven wear thickness and the HAZ width on the rail steel surfaces was obtained using the rolling fatigue tester as shown in FIG. 7. Meanwhile, the rolling fatigue tester is composed of a rail moving slider 5, a rail 6, a train wheel 7, a motor 8, and a load-loading apparatus 9.

In the rolling fatigue tester, 136-pound rail (AREA 136 RE) having a length of 2 m was used as the rail steel, and an AAR (the American Railway Engineering Association) type having a diameter of 920 mm was used as the train wheel. The radial load was 196 kN, and the thrust load was 9.8 kN. In addition, the test was carried out by carrying out intermittent water supply between the rail steel and the train wheel.

Figure 8:
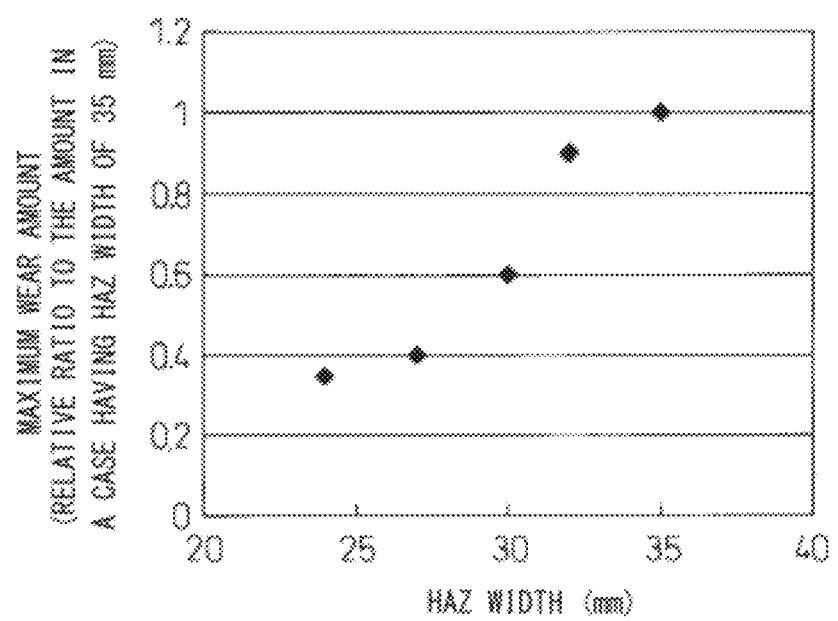
FIG. 8 is a view showing the relationship between the HAZ width and the uneven wear depth that are obtained using the rolling fatigue tester of the embodiment.

After 2.5-million repetitions of the rolling fatigue tests were carried out, the depths of the uneven wear occurring at the softened portion of the rail steel were measured respectively. FIG. 8 shows the results in a case in which the maximum wear amount is 1 at a HAZ width of 35 mm.

As shown in FIG. 8, in a case in which the HAZ width is narrower than 27 mm, the wear depth is extremely decreased.

In addition, since the relationship between the HAZ width and the softened width as shown in FIG. 5 shows that the softened width is 10 mm at a HAZ width of 27 mm, conditions necessary for reducing the uneven wear and damage in the rail steel are preferably a HAZ width of 27 mm or less and a softened width of 10 mm or less.

In addition, the relationship between the latter flashing velocity and the HAZ width as shown in FIG. 4 shows that the latter flashing velocity for obtaining a HAZ width of 27 mm is 2.1 mm/sec. That is, the latter flashing velocity is preferably set to 2.1 mm/sec or more in order to satisfy the conditions of a HAZ width of 27 mm or less and a softened width of 10 mm or less.

In addition, the upper limit of the latter flashing velocity is preferably set to 2.8 mm/sec. This results from the following reasons. A narrower HAZ width and softened width can be obtained as the latter flashing velocity is increased; however, when the velocity is excessively increased in a case in which the capacity of the transformer in the welder is small or the heat input amount is small before the flashing velocity is increased, that is, before the latter flashing butt process, it becomes impossible to supply heat input sufficient enough to generate an arc. As a result, it is not possible to stably and continuously generate latter flashing, and there are also cases in which freezing results depending on cases.

Figure 9:
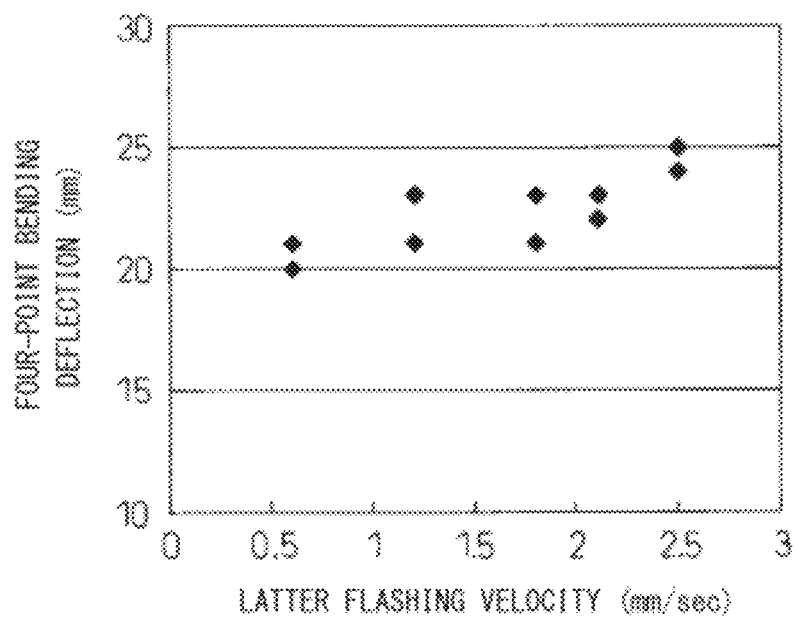
FIG. 9 is a view showing the relationship between the latter flashing velocity and the four-point bending maximum deflection amount in the embodiment.

Furthermore, flash butt welding is carried out under the above conditions, welding joints having several kinds of HAZ widths and softened widths, which are obtained by the flash butt welding, are used as test specimen materials, and four-point bending tests were carried out with an inter-point distance of 48 inches (1219.2 mm) and a distance between pressurized points of 12 inches (304.8 mm) based on Standard 3.11.2.6 of the American Railway engineering and maintenance-of-Way Association (AREMA). The results are shown in FIG. 9. Meanwhile, the standard value of the maximum deflection amount of the four-point bending is 19 mm in the AREMA standard.

As shown in FIG. 9, the bending performance of the joint whose HAZ width and softened width are narrowed by increasing the latter flashing velocity satisfies the standard value of 19 mm, which is the AREMA standard.

The flash butt welding was begun at a flashing velocity of 2.1 mm/sec, and, as conditions for maintaining flashing even in the subsequent processes in the flash butt welder that the inventors used in the beginning were a number of preheating processes of 7, and a flashing time of 120 seconds.

In addition, in the embodiment, in addition to the condition of the latter flashing velocity for obtaining the narrow HAZ width and softened width as described above, the latter flash-off distance in the latter flashing butt process is preferably set to 10 mm to 60 mm. Hereinafter, the numerical limitation of the latter flash-off distance will be described.

Figure 10:
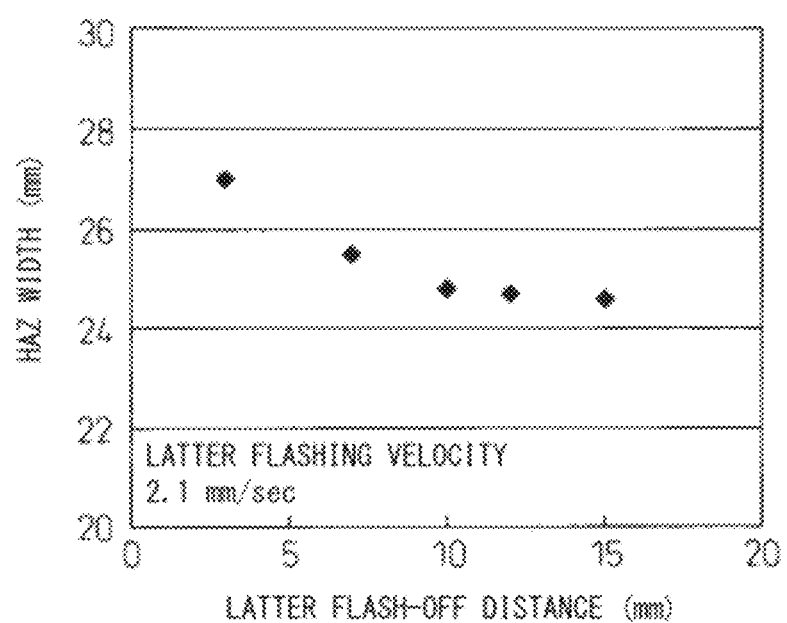
FIG. 10 is a view showing the relationship between the latter flash-off distance and the HAZ width (in a case in which the latter flashing velocity is 2.1 mm/sec) in the embodiment.

FIG. 10 shows the relationship between the flash-off distance and the HAZ width when the latter flashing velocity is 2.1 mm/sec, and the flash butt welding is carried out using the above welding conditions.

As shown in FIG. 10, it is found that the HAZ width is narrower as the latter flash-off distance is increased. This is because the heat distribution in the vicinities of the welding surfaces becomes more precipitous by increasing the latter flash-off distance, and, consequently, the HAZ width and the softened width are reduced.

In addition, FIG. 10 shows that the reduction of the HAZ width is saturated in a case in which the flash-off distance is 10 mm or more. Therefore, the lower limit of the preferable range of the latter flash-off distance is set to 10 mm.

In addition, when the latter flash-off distance is excessively increased, the amount of scattering molten metal is increased, the surrounding of the electrodes connected to the rail steel is contaminated, and there is a concern that the yield of the rail steel may be lowered. Furthermore, there is another concern that intervention by facilities, such as the electrodes, may occur. Therefore, the upper limit of the preferable latter flash-off distance is set to 60 mm from the viewpoint of limitations in environment, costs, and facilities.

Figure 11:
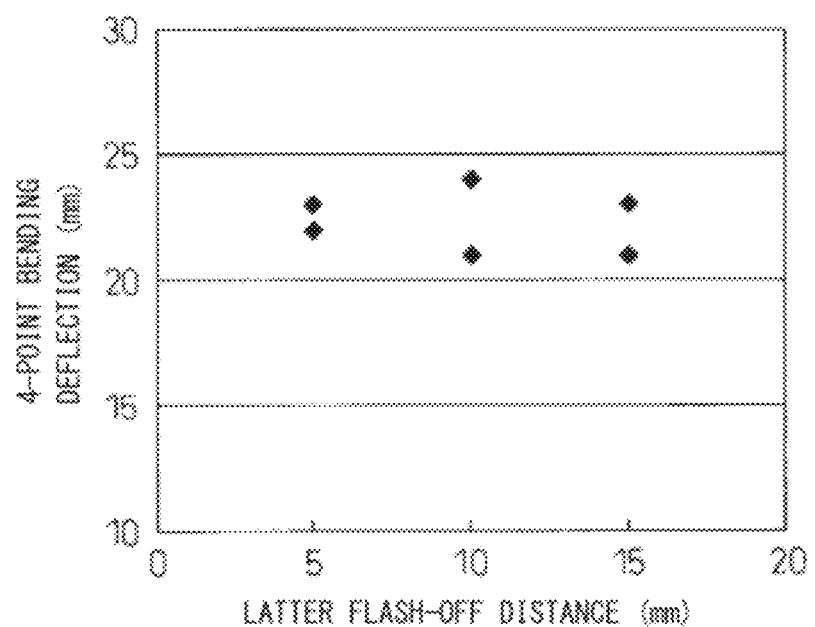
FIG. 11 is a view showing the relationship between the latter flashing velocity and the four-point bending maximum deflection amount in the embodiment when the latter flashing velocity is 2.1 mm/sec.

Next, the bending performance of the welded rail is shown in FIG. 11. As shown in FIG. 11, it is possible to obtain a bending performance that sufficiently satisfies the standard value even when the latter flash-off distance is increased.

As described above, according to the flash butt welding method of the embodiment, the heat distribution in the vicinities of the welding surfaces becomes precipitous, and therefore it is possible to obtain a HAZ width and a softened width which are narrower than in the related art. In addition, as a result, uneven wear due to the contact between the surface layer of the rail head portion and a train wheel is reduced, and therefore damage occurring on the surface layer of the rail head portion can be reduced, and, furthermore, noise or vibration can be reduced.

In addition, it is possible to obtain a HAZ width and a softened width which are narrower than in the related art, and, simultaneously, the bending performance can also be satisfied at the same time.

Furthermore, when welding is carried out with a latter flash-off distance in a range of 10 mm to 60 mm, a narrower HAZ width and softened width can be obtained. Thereby, damage occurring on the surface layer of the rail head portion can be more reduced.

In addition, as a result of the reduction of the uneven wear, the reduction of damage on the layer surface, and the like, contribution to the cycle extension of grinding cutting on the rail surface layer and also the cycle extension of rail exchange is possible.

In addition, since uneven wear is reduced, an impact supplied to a rail when train wheels pass can be suppressed, and it is possible to prevent fatigue breakdown of rail.

In addition, sufficiently narrow HAZ width and softened width can be obtained even when a latter flash-off distance that satisfies the following Formula (1) is used instead of regulating the latter flashing velocity to 2.1 mm/sec to 2.8 mm/sec as described above as a modified example of the embodiment. Here, the erosion amount per second in the latter flashing process can be obtained by (the total erosion amount in the latter flashing process/the time necessary for the latter flashing process).

$$60 \geq \text{latter flash-off distance} \geq 22.6 - 6 \times [\text{erosion amount per second in the latter flashing process}] \quad \text{Formula (1)}$$

Meanwhile, when the latter flash-off distance that satisfies the above Formula (1) is employed, the latter flashing velocity may be regulated in a range of 0.5 mm/sec to 2.8 mm/sec, preferably in a range of 1.2 mm/sec to 2.8 mm/sec, and more preferably 2.1 mm/sec to 2.8 mm/sec.

Hereinafter, the Formula (1) and the reasons of the limitation of the latter flashing velocity will be described.

Firstly, the latter flashing velocity was set to 2.5 mm/sec, flash butt welding was carried out under the above welding conditions, and the relationship between the latter flash-off distance and the HAZ width was obtained. The relationship is shown in FIG. 12.

Figure 12:
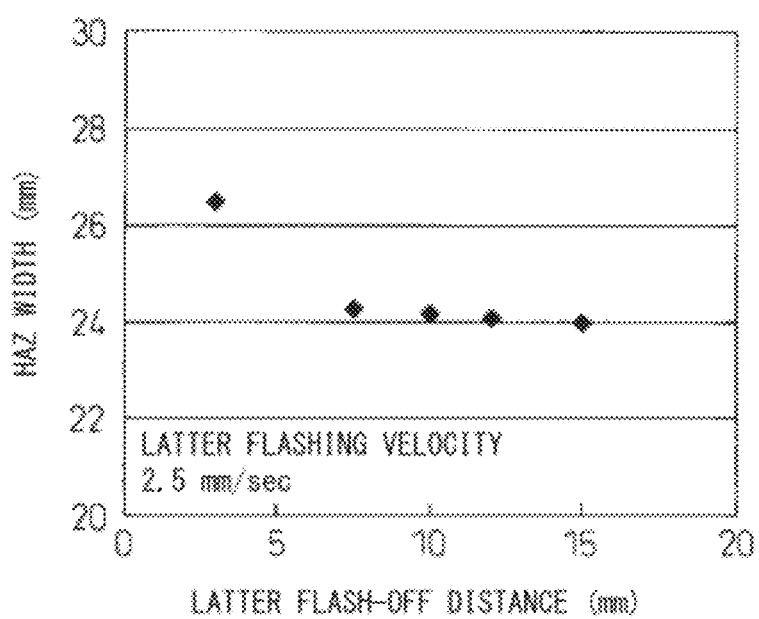
FIG. 12 is a view showing the relationship between the latter flash-off distance and the HAZ width (in a case in which the latter flashing velocity is 2.5 mm/sec) in the embodiment.

As shown in FIG. 12, the HAZ width is narrowed when the latter flash-off distance is increased even in a case in which the latter flashing velocity is 2.5 mm/sec. In addition, the HAZ width is saturated at a latter flash-off distance of 7.5 mm or more in a case in which the flashing velocity is 2.5 mm/sec.

Figure 13:
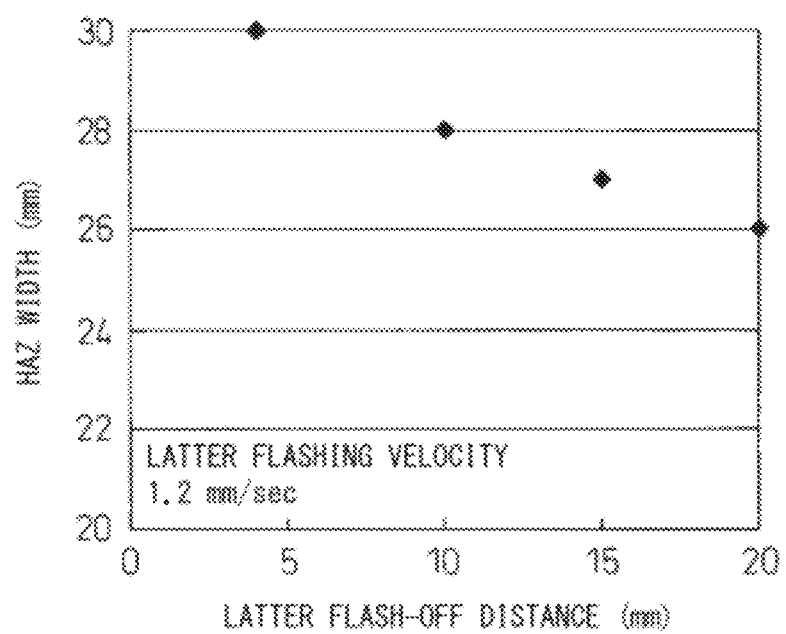
FIG. 13 is a view showing the relationship between the latter flash-off distance and the HAZ width (in a case in which the latter flashing velocity is 1.2 mm/sec) in the embodiment.

Next, the relationship between the latter flash-off distance and the HAZ width was obtained in a case in which the latter flashing velocity was set to 1.2 mm/sec. The relationship is shown in FIG. 13. As shown in FIG. 13, the HAZ width is 30 mm in a case in which the latter flash-off distance is set to 3 mm, but the HAZ width is narrowed when the latter flash-off distance is increased, a HAZ width of 27 mm or more can be obtained in a case in which the latter flash-off distance is set to 15 mm. Meanwhile, although not shown in the drawing, the bending performance can be higher than the four-point bending standard value in this case.

Based on the relationships between the latter flash-off distance and the HAZ width as shown in FIGS. 10, 12, and 13, it is found that it is preferable to employ the latter flash-off distance that satisfies the Formula (1) in order to obtain narrow HAZ width and softened width.

Meanwhile, an excessive increase in the latter flash-off distance results in environmental deterioration on the welding surfaces due to scattering of the molten metal and a larger yield decrease, and therefore the upper limit value of the Formula (1) is preferably 60 mm.

In addition, when the latter flashing velocity is decreased, the effect of forming a precipitous heat distribution in the vicinities of the welding surfaces becomes small even when the latter flash-off distance is increased, and therefore the lower limit value of the latter flashing velocity is set to 0.5 mm/sec in a case in which the Formula (1) is satisfied. On the other hand, when the latter flashing velocity is excessively increased, there are cases in which freezing occurs, and therefore the upper limit value of the latter flashing velocity is set to 2.8 mm/sec.

Examples

Hereinafter, the feasibility and effects of the invention will be further described using examples. Meanwhile, the conditions used in the examples are merely an example for confirmation, and the invention is not limited only to the examples.

AREA 136 RE rail steel which exhibits a pearlite structure including, by mass %, C: 0.85% to 1.2%, Si: 0.1% to 2.0%, and Mn: 0.1% to 2.0%, and has a weight per meter of 136 pounds was supplied for flash butt welding.

A flash welder having an AC power supply, a transformer capacity of 400 kVA, and an upset load of 70 kN was used as the flash butt welder. The welding was carried out in a manner such that the flashing process and the preheating process were combined, the number of preheating processes was 10, the total time of the initial flashing process and the former flashing process was set to 90 seconds, the latter flashing velocity and the latter flash-off distance in the latter flashing process were changed respectively according to Table 1.

After the flash butt welding under the above conditions, the HAZ width, the softened width, and the bending performance were obtained to evaluate welding joints. The HAZ width was macro-observed on cross sections in the rail longitudinal direction, and obtained 5 mm below the surface layer of the rail steel head portion. Similarly to the HAZ width, the softened width was set to a range below the average value of the base material hardness −3σ after Vickers hardness tests were carried out with a test force of 100 N at a location 5 mm below the surface layer of the rail steel head portion in the cross-section in the rail longitudinal direction. With regard to the bending performance, four-point bending tests were carried out with an inter-point distance of 48 inches and a distance between pressurized points of 12 inches based on the above AREMA Standard, and the maximum deflection amount was obtained.

For the evaluation of the HAZ width, 27 mm or less, which is a significantly reduced wear depth of uneven wear in the rolling fatigue test, was used as the standard. In addition, 10 mm or less, which corresponds to the HAZ width of 27 mm, was used as the standard of the softened width. In addition, with regard to the bending performance, a four-point bending deflection amount of 19 mm or more was used as the standard in the AREMA standard.

surface, and the like, contribution to the cycle extension of grinding cutting on the rail surface layer and also the cycle extension of rail exchange is possible. In addition, since uneven wear is reduced, an impact supplied to a rail when train wheels pass can be suppressed, and it is possible to prevent fatigue breakdown of a rail.

REFERENCE SIGNS LIST 1A, 1B RAIL STEEL
2 ELECTRODE
3 POWER SUPPLY
4 MOVEMENT DIRECTION OF RAIL STEEL
5 RAIL MOVING SLIDER
6 RAIL
7 TRAIN WHEEL
8 MOTOR
9 LOAD-LOADING APPARATUS

TABLE 1

|  | Latter flashing velocity (mm/sec) | Latter flash-off distance (mm) | 22.6 − 6 × (Erosion amount per second in latter flashing process) | HAZ width | Softened width | Relative wear amount (with amount in example having HAZ width of 35 mm given as 1) | Bending property: Four-point bending deflection (mm) |
|---|---|---|---|---|---|---|---|
| Inventive example 1 | 2.1 | 15 | 10 | 24.5 | 7.6 | 0.3 | 22.0 |
| Inventive example 2 | 2.1 | 8 | 10 | 25.5 | 8.7 | 0.3 | 21.0 |
| Inventive example 3 | 2.5 | 5 | 7.6 | 25.8 | 9.0 | 0.3 | 22.5 |
| Inventive example 4 | 2.5 | 9 | 7.6 | 24.2 | 7.2 | 0.3 | 21.5 |
| Inventive example 5 | 1.8 | 15 | 11.8 | 26.5 | 9.7 | 0.3 | 20.0 |
| Inventive example 6 | 1.2 | 18 | 15.4 | 26.5 | 9.7 | 0.3 | 21.0 |
| Inventive example 7 | 0.5 | 22 | 19.6 | 26.6 | 9.8 | 0.3 | 20.0 |
| Comparative example 1 | 1.8 | 5 | 11.8 | 28.5 | 11.8 | 0.5 | 21.5 |
| Comparative example 2 | 1.2 | 3 | 15.4 | 30.0 | 13.2 | 0.6 | 20.0 |
| Comparative example 3 | 0.5 | 3 | 19.6 | 35.0 | 17.6 | 1.0 | 19.5 |

The results are shown in Table 1.

It was possible to satisfy the provisions of the invention, a HAZ width of 27 mm or less, and a softened width of 10 mm or less in Invention Examples 1 to 4 in which the latter flashing velocity was 2.1 mm/sec or more and Invention Examples 5 to 7 in which the latter flashing velocity was less than 2.1 mm/sec, but the latter flash-off distance was higher than 22.6−6×[erosion amount per second in the latter flashing process].

However, it was not possible to satisfy the provisions of the invention, and satisfy the HAZ width and the softened width in the cases of Comparative Examples 1 to 3 in which the latter flashing velocity was less than 2.1 mm/sec, and the latter flash-off distance was equal to or smaller than 22.6−6×[erosion amount per second in the latter flashing process].

[Table 1]

INDUSTRIAL APPLICABILITY

According to the invention, as a result of the reduction of uneven wear of a rail, the reduction of damage on the

The invention claimed is:

1. A flash butt welding method of a pair of track rail steel pieces, comprising:
  applying, in an initial flashing process, a voltage to the pair of track rail steel pieces, and welding surfaces, which are the end surfaces of the pair of track rail steel pieces, are slowly brought close to each other so that short-circuit currents are made to flow locally, the welding surfaces are heated and welded through resistance heating, furthermore, flashing is caused in the welding surfaces, and the welding surfaces are heated by the resistance heating and arc heating of the flashing;
  causing to flow, in a preheating process, after the initial flashing process, an electric current for a predetermined time in a state in which the welding surfaces are forcibly brought into contact with each other, and vicinities of the welding surfaces are heated by the resistance heating;
  partially causing, in a former flashing process, after the preheating process, the flashing in the welding surfaces, and the welding surfaces are heated by the resistance heating and the arc heating of the flashing;

furthermore causing, in a latter flashing process, after the former flashing process, the flashing throughout the entire welding surfaces, and the entire welding surfaces are uniformly heated by the resistance heating and the arc heating of the flashing; and abruptly bringing close to each other, in an upsetting process, after the latter flashing process, the welding surfaces by a large welding pressure, a majority of a molten metal on the welding surfaces is exhausted outside, and rear portions of the welding surfaces, which are heated to a high temperature, are pressurized and deformed, thereby forming a welded portion, wherein a velocity at which the pair of the rail steel pieces are brought close to each other in the former flashing process is defined as a former flashing velocity and a velocity at which the pair of the rail steel pieces are brought close to each other in the latter flashing process is defined as a latter flashing velocity, wherein the former flashing velocity is more than 0 mm/sec, and wherein the latter flashing velocity in the latter flashing process is 2.1 mm/sec to 2.8 mm/sec and is increased to higher than the former flashing velocity in the former flashing process.

2. The flash butt welding method according to claim 1, wherein a latter flash-off distance in the latter flashing process is 10 mm to 60 mm.

3. The flash butt welding method according to claim 1, wherein a latter flash-off distance in the latter flashing process is in the range defined in equation 1:

$$60 \text{ mm} \geq [\text{latter flash-off distance}] \geq \{22.6-(6\times[\text{erosion amount per second in the latter flashing process}])\}\text{mm} \quad (\text{equation 1}).$$

4. The flash butt welding method according to claim 1, wherein each of the pair of track rail steel pieces contains Carbon (C): 0.85% to 1.20% by mass %.

5. The flash butt welding method according to claim 1, wherein a Heat Affected Zone (HAZ) width in a welding joint portion is 27 mm or less, and a softened width is 10 mm or less.

6. A flash butt welding method of a pair of track rail steel pieces, comprising:

causing to flow, in a preheating process, an electric current for a predetermined time in a state in which welding surfaces of the pair of track rail steel pieces are forcibly brought into contact with each other, and vicinities of the welding surfaces are heated by resistance heating;

partially causing, in a former flashing process after the preheating process, a flashing in the welding surfaces, and the welding surfaces are heated by the resistance heating and arc heating of the flashing;

furthermore causing, in a latter flashing process after the former flashing process, the flashing throughout the entire welding surfaces, and the entire welding surfaces are uniformly heated by the resistance heating and the arc heating of the flashing; and abruptly bringing close to each other, in an upsetting process after the latter flashing process, the welding surfaces by a large welding pressure, a majority of a molten metal on the welding surfaces is exhausted outside, and rear portions of the welding surfaces, which are heated to a high temperature, are pressurized and deformed, thereby forming a welded portion, wherein a velocity at which the pair of the rail steel pieces are brought close to each other in the former flashing process is defined as a former flashing velocity and a velocity at which the pair of the rail steel pieces are brought close to each other in the latter flashing process is defined as a latter flashing velocity, wherein the former flashing velocity is more than 0 mm/sec, and wherein a latter flash-off distance in the latter flashing process is in the range defined in equation 1 and the latter flashing velocity in the latter flashing process is increased as compared to the former velocity in the former flashing process:

$$60 \text{ mm} \geq [\text{latter flash-off distance}] \geq \{22.6-(6\times[\text{erosion amount per second in the latter flashing process}])\}\text{mm} \quad (\text{equation 1}).$$

7. The flash butt welding method according to claim 6, wherein a latter flashing velocity in the latter flashing process is 0.5 mm/sec to 2.8 mm/sec.

8. The flash butt welding method according to claim 6, wherein the track rail steel contains Carbon (C): 0.85% to 1.20% by mass %.

9. The flash butt welding method according to claim 6, wherein a Heat Affected Zone (HAZ) width in a welding joint portion is 27 mm or less, and a softened width is 10 mm or less.

10. The flash butt welding method according to claim 2, wherein each of the pair of track rail steel pieces contains Carbon (C): 0.85% to 1.20% by mass %.

11. The flash butt welding method according to claim 2, wherein a Heat Affected Zone (HAZ) width in a welding joint portion is 27 mm or less, and a softened width is 10 mm or less.

12. The flash butt welding method according to claim 7, wherein the track rail steel contains Carbon (C): 0.85% to 1.20% by mass %.

13. The flash butt welding method according to claim 7, wherein a Heat Affected Zone (HAZ) width in a welding joint portion is 27 mm or less, and a softened width is 10 mm or less.

* * * * *